Patented May 26, 1942

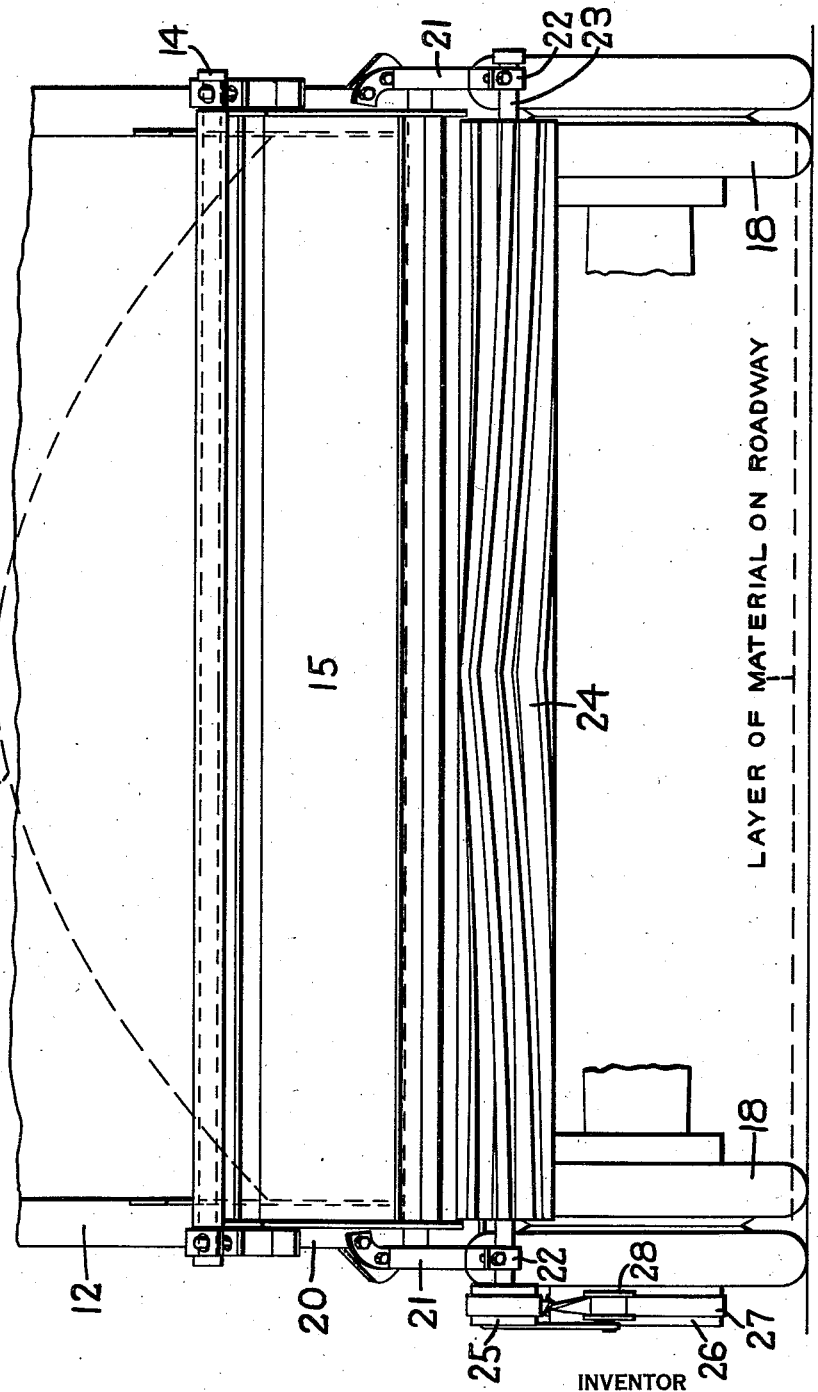

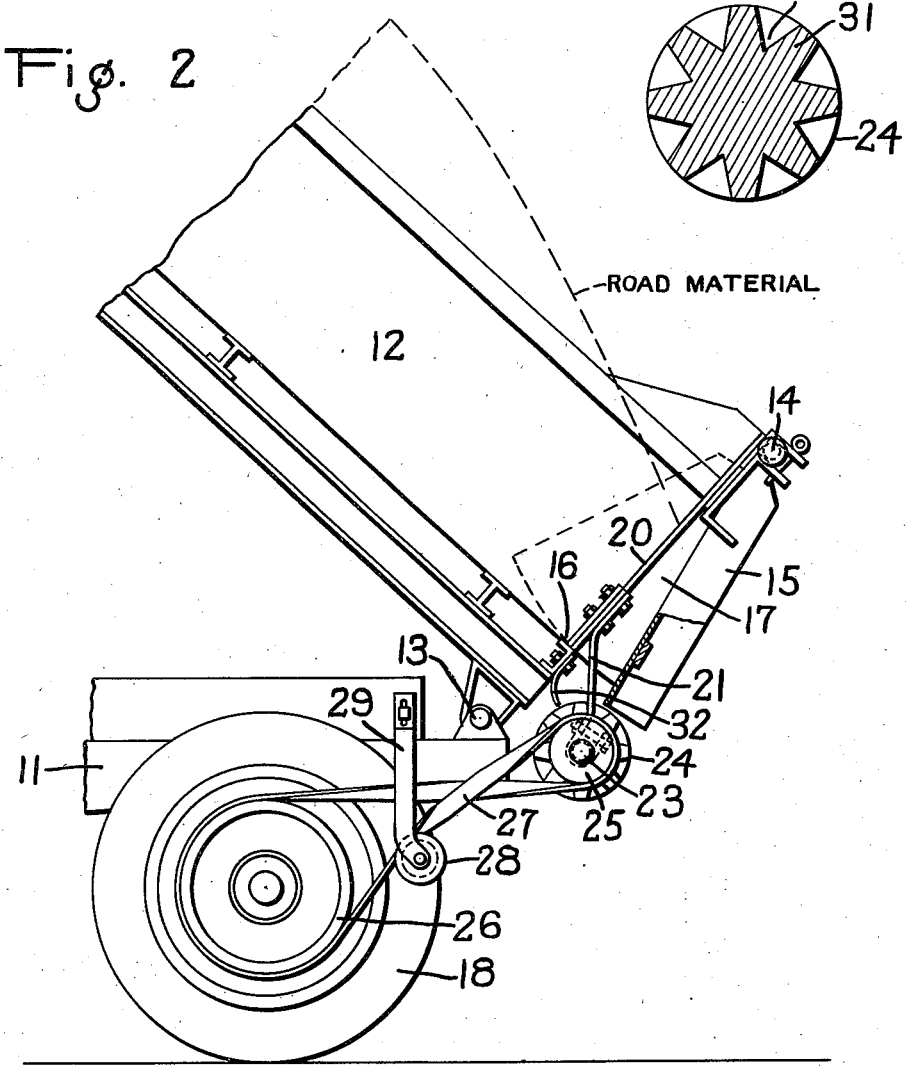
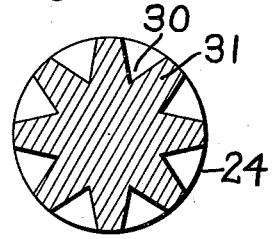

2,284,175

UNITED STATES PATENT OFFICE 2,284,175

ROAD MATERIAL DISTRIBUTOR

Stewart S. Stabley, Red Lion, Pa.

Application November 27, 1939, Serial No. 306,295

2 Claims. (Cl. 275—2)

This invention relates to spreading apparatus, and more particularly to machines for distributing road materials.

An object of the invention is to provide an improved road material distributing apparatus in which means are included for spreading the material uniformly throughout the width of the apparatus.

Another object of the invention is to provide an improved road material distributing apparatus which can be readily applied to a vehicle and more particularly to a dumping body of the vehicle.

With the foregoing and other objects and advantages in view, the invention consists in the preferred construction and arrangement of the several parts which will be hereinafter fully described and claimed.

In the accompanying drawings:

Figure 1 is a rear end view of a portion of a dump truck body having my improved material distributor attached thereto;

Fig. 2 is a side elevation, partly in section, of the structure shown in Fig. 1; and Fig. 3 is a vertical transverse section of the material distributing roller.

Referring to the drawings, the chassis or frame 11 of a vehicle of any desired type has a body 12 mounted thereon for tilting movement, said body usually being pivotally connected, as indicated at 13, Fig. 2, to the rear portion of said frame.

Pivotally connected as indicated at 14, to the rear portion of the body 12, is a tail gate 15. The lower portion of the tail gate 15 is adapted to move outwardly from the bottom portion 16 of the body 12, when the front portion of the body is elevated in well known manner.

At the ends of the tail gate 15 there are plates 17 adapted to close the gaps at the end of the body when the tail gate is in the open position illustrated.

The vehicle is supported, as usual, on wheels, only the rear wheels 18 being illustrated.

The end portion of the body 12 is formed with a flange 20, to which is secured the upper end of a bracket 21. As shown in Fig. 1 there is a bracket 21 at each side of the body 12.

The brackets 21 provide means for supporting journals 22 for the shaft 23 of an elongated roller 24 which is disposed at the rear of the body 12 directly beneath the tail gate 15, said roller having a length equal substantially to the width of said body.

One end of the shaft 23 carries a pulley 25 which is operatively connected to a pulley 26 mounted on a wheel 18, by a belt 27.

An idle roller 28 carried by a bracket 29 adjustably mounted on the frame 11, is suitably positioned for keeping the belt 27 taut.

It will be understood that sprockets and a chain may be substituted for the pulleys 25 and 26 and the belt 27, respectively, for the purpose of operating the roller 24, without departing from the present invention.

As shown in Figs. 1 and 3, the exterior of the roller 24 is formed with a series of radially disposed grooves 30, which are V-shaped in cross section.

Between each groove 30, there is a rib 31, said ribs having relatively broad outer peripheral surfaces arranged between said grooves.

The grooves 30 and the ribs 31, which are coextensive with the length of the roller 24, are angularly disposed with respect to the longitudinal center line or axis of said roller. That is to say, as shown in Fig. 1, each groove 30 and rib 31 is inclined from the mid portion of the roller 24 downwardly at an angle to the longitudinal axis of said roller, so that the mouths of the grooves and the ends of the ribs at both extremities of the roller 24 are disposed in positions offset with relation to the positions of the grooves and ribs at the mid portion of the roller.

The grooves 30 are constructed V-shaped in cross section so that particles of the road materials will not become lodged in the grooves during operation of the device, such particles of material being adapted to be carried by the grooves through a limited angle of rotation of the roller and to then be discharged therefrom.

Attached to the lower edge of the rear portion of the body 12 and extending towards the roller 24, is a plate 32. This plate is adapted to direct material discharged from the body 12 on to the roller 24 and to also prevent material from falling downwardly through the space between the rear of the body and said roller.

When a dump truck body is loaded with road material, the material is usually piled in the form of a cone. When the truck is transported to the work on the roadway upon which it is desired to place the material, since the material is heaped higher in the central portion of the body than along the sides thereof, when the body is elevated and the material is discharged therefrom through the gap between the rear of the body and the tail gate, considerably more material will be delivered from the central portion of the body than from the side portions thereof.

Accordingly, by the present invention, due to the specific construction of the roller 24 having the grooves 30 and ribs 31 angularly disposed with respect to the axis of the roller, the greater mass of material in the center will be directed by the grooves towards the ends of the roller, and consequently the material will be discharged from the roller and fall on to the roadway in a uniform layer. This is true irrespective of whether the material consists of small or coarse particles of broken stone, stone chips of various sizes, gravel of various sizes, sand, and other such material used in making and resurfacing roadways.

Having thus described my invention, what I claim is:

1. A road material distributing apparatus comprising a vehicle having a tiltable body with a rear discharge end, a tail gate pivotally connected at its upper edge to the rear of the body, said tail gate being adapted to close the rear end of the body when the body is not tilted, said tail gate being adapted to swing outwardly on its pivot when the front end of the body is tilted upwardly so that the lower edge of the tail gate is spaced from the rear end of the body structure to provide a restricted elongated transverse opening for the material discharged from the body, an elongated roller arranged at the rear end of the body, means for rotatably supporting said roller in proximity to said discharge opening so that the roller will be positioned beneath the discharge opening when the front end of the body is elevated, a series of parallel grooves formed in the periphery of said roller, said grooves being adapted to provide pockets for containing a predetermined quantity of road material discharged from said body, the grooves being angularly disposed with respect to the longitudinal center line of the roller and being oppositely pitched in the direction of rotation of the roller from the mid portion of the roller toward the ends of the roller, and means operatively connecting said roller with a wheel of the vehicle for rotating the roller in a direction opposite to the direction of rotation of the vehicle wheels so that said roller discharges the material thereon to the rear when the vehicle is moving forwardly.

2. A road material distributing apparatus comprising a tiltable vehicle body having a rear open discharge end, a tail gate, means for pivotally connecting the upper edge portion of the tail gate to the rear end of the body so that the lower edge of the tail gate will swing outwardly with respect to the body when the front end of said body is elevated thereby to provide a restricted elongated transverse discharge opening, plates mounted on the body and arranged at each end of the tail gate so as to close the gaps at the rear end of the body when the tail gate is in an open position, a roller, means for rotatably supporting said roller so that the roller will be located in spaced relation to said body, below and in proximity to said discharge opening when the front end of the body is elevated, means for rotating the roller whereby said roller turns in a direction opposite to the direction in which the vehicle wheels rotate, a series of parallel V-shaped grooves formed in the periphery of said roller to provide pockets for containing a predetermined quantity of road material, said grooves being angularly disposed with respect to the longitudinal center line of the roller and being oppositely pitched in the direction of rotation of the roller from the mid portion of the roller toward the ends thereof, and a plate fixed to the discharge edge of the body and extending towards said rollers, said roller and said plate being coextensive with the length of the discharge end of the body and said plate being adapted to direct material discharged from the body on to said roller and to also prevent material from falling downwardly through the space between the open end of the body and said roller.

STEWART S. STABLEY.